(12) United States Patent
Temam et al.

(10) Patent No.: US 11,501,144 B2
(45) Date of Patent: *Nov. 15, 2022

(54) NEURAL NETWORK ACCELERATOR WITH PARAMETERS RESIDENT ON CHIP

(71) Applicant: Google LLC, Mountain View, CA (US)

(72) Inventors: Olivier Temam, Antony (FR); Harshit Khaitan, San Jose, CA (US); Ravi Narayanaswami, San Jose, CA (US); Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 16/569,607

(22) Filed: Sep. 12, 2019

(65) Prior Publication Data
US 2020/0005128 A1    Jan. 2, 2020

Related U.S. Application Data

(63) Continuation of application No. 16/059,686, filed on Aug. 9, 2018, now Pat. No. 10,504,022.
(Continued)

(51) Int. Cl.
*G06N 3/063*    (2006.01)
*G06N 3/04*    (2006.01)
(Continued)

(52) U.S. Cl.
CPC .......... *G06N 3/063* (2013.01); *G06F 9/3887* (2013.01); *G06F 9/3895* (2013.01); *G06F 13/00* (2013.01);
(Continued)

(58) Field of Classification Search
CPC .... G06N 3/063; G06N 3/0454; G06N 3/0481; G06F 9/3887; G06F 9/3895; G06F 13/00; G06F 17/16
See application file for complete search history.

(56) References Cited

U.S. PATENT DOCUMENTS 5,375,238 A    12/1994    Ooi
5,958,048 A    9/1999    Babaian
(Continued)

FOREIGN PATENT DOCUMENTS

CN    1492316 A    4/2004
CN    104838357 A    8/2015
(Continued)

OTHER PUBLICATIONS

DianNao: A Small-Footprint High-Throughput Accelerator for Ubiquitous Machine-Learning Chen et al. (Year: 2014).*
(Continued)

*Primary Examiner* — Kakali Chaki
*Assistant Examiner* — Ababacar Seck
(74) *Attorney, Agent, or Firm* — Fish & Richardson P.C.

(57) ABSTRACT

One embodiment of an accelerator includes a computing unit; a first memory bank for storing input activations and a second memory bank for storing parameters used in performing computations, the second memory bank configured to store a sufficient amount of the neural network parameters on the computing unit to allow for latency below a specified level with throughput above a specified level. The computing unit includes at least one cell comprising at least one multiply accumulate ("MAC") operator that receives parameters from the second memory bank and performs computations. The computing unit further includes a first traversal unit that provides a control signal to the first memory bank to cause an input activation to be provided to a data bus accessible by the MAC operator. The computing unit performs computations associated with at least one element of a data array, the one or more computations performed by the MAC operator.

8 Claims, 9 Drawing Sheets

Related U.S. Application Data

(60) Provisional application No. 62/544,171, filed on Aug. 11, 2017.

(51) Int. Cl.
  *G06F 13/00* (2006.01)
  *G06F 9/38* (2018.01)
  *G06F 17/16* (2006.01)

(52) U.S. Cl.
  CPC ........... *G06F 17/16* (2013.01); *G06N 3/0454* (2013.01); *G06N 3/0481* (2013.01)

(56) References Cited

U.S. PATENT DOCUMENTS

| | | | |
|---|---|---|---|
| 8,448,157 | B2 | 5/2013 | Mitran et al. |
| 8,539,211 | B2 | 9/2013 | Hoogerbrugge |
| 8,806,183 | B1 | 8/2014 | Yearsley |
| 8,817,026 | B1 | 8/2014 | Zimmerman |
| 8,904,155 | B2 | 12/2014 | Dieffenderfer et al. |
| 9,710,265 | B1 | 7/2017 | Temam et al. |
| 9,875,100 | B2 | 1/2018 | Woo et al. |
| 9,875,104 | B2 | 1/2018 | Woo et al. |
| 10,228,947 | B2 | 3/2019 | Woo et al. |
| 2001/0021972 | A1 | 9/2001 | Topham |
| 2004/0034754 | A1 | 2/2004 | Schreiber |
| 2004/0088529 | A1 | 5/2004 | Schreiber |
| 2004/0093550 | A1 | 5/2004 | Kadatch et al. |
| 2004/0187102 | A1 | 9/2004 | Garthwaite |
| 2008/0195851 | A1 | 8/2008 | Hoogerbrugge |
| 2008/0301697 | A1 | 12/2008 | Southgate |
| 2010/0122066 | A1 | 5/2010 | Fischer |
| 2010/0169612 | A1 | 7/2010 | Persson et al. |
| 2010/0274972 | A1 | 10/2010 | Babayan et al. |
| 2011/0107068 | A1 | 5/2011 | Mitran et al. |
| 2013/0185540 | A1 | 7/2013 | Ching-Yu et al. |
| 2013/0212052 | A1* | 8/2013 | Yu ........................... G06N 3/04 706/27 |
| 2014/0067735 | A1* | 3/2014 | Yu ........................... G06N 3/02 706/20 |
| 2014/0181171 | A1 | 6/2014 | Dourbal |
| 2014/0188961 | A1 | 7/2014 | Plotnikov et al. |
| 2017/0103301 | A1* | 4/2017 | Henry ................... G06F 9/3004 |
| 2017/0103309 | A1* | 4/2017 | Chang ...................... G06N 3/04 |
| 2017/0200094 | A1* | 7/2017 | Bruestle .................... G06F 5/01 |
| 2017/0220352 | A1 | 8/2017 | Woo et al. |
| 2017/0323224 | A1* | 11/2017 | Bruestle ................. G06N 20/00 |
| 2017/0337468 | A1* | 11/2017 | Bruestle ................... G06N 3/04 |
| 2018/0107483 | A1 | 4/2018 | Woo et al. |

FOREIGN PATENT DOCUMENTS

| | | | |
|---|---|---|---|
| CN | 105184366 | | 12/2015 |
| CN | 105260322 A | | 1/2016 |
| CN | 105488565 | | 4/2016 |
| CN | 105892989 | | 8/2016 |
| CN | 105930902 | | 9/2016 |
| CN | 106485317 | | 3/2017 |
| CN | 106557332 | | 4/2017 |
| CN | 106875011 | | 6/2017 |
| CN | 106909970 | | 6/2017 |
| EP | 3893123 A1 * | 10/2021 | ............. G06F 5/01 |
| JP | H03-121581 | | 5/1991 |
| JP | 2001-117900 | | 4/2001 |
| TW | 201617977 | | 5/2016 |
| TW | 201640422 | | 11/2016 |
| WO | WO 2001/90888 | | 11/2001 |
| WO | WO 2013/095601 | | 6/2013 |
| WO | WO-2017201627 | | 11/2017 |
| WO | WO-2017201627 A1 * | 11/2017 | ............. G06N 3/049 |

OTHER PUBLICATIONS

DaDianNao: A Machine-Learning Supercomputer Chen et al. (Year: 2014).*
GB Office Action in Great Britain Application No. GB1812820.7, dated Mar. 16, 2020, 4 pages.
EP Office Action in European Application No. 18762676.7, dated Nov. 25, 2021, 12 pages.
International Preliminary Report on Patentability in International Application No. PCT/US2018/045974, dated Feb. 11, 2020, 9 pages.
"LOOP/LOOPcc: Loop According to ECX Counter," retrieved on Dec. 23, 2015, retrieved from the Internet: URL<http://x86.renejeschke.de/html/file_module_x86_id_161.html>, 1 page.
Abandah, "Reducing Communication Cost in Scalable Shared Memory Systems", Year 1998.
Baumgartner et al., "Synthesis of High-Performance Parallel Programs for a Class of Ab Initio Quantum Chemistry Models," Proceedings of the IEEE, 93(2):276-292, Feb. 2005.
Chen et al. "DianNao family: energy-efficient hardware accelerators for machine learning," Communications of the ACM, vol. 59, No. 11, Oct. 28, 2016, 8 pages.
Cociorva et al., "Loop Optimizations for a Class of Memory-Constrained Computations," ICS '01 Proceedings of the 15th international conference on Supercomputing, pp. 103-113, 2001.
Extended European Search Report issued in European Application No. 16207511.3, dated Oct. 4, 2018, 18 pages.
Gao et al. "TETRIS: scalable and efficient neural network acceleration with 3D memory," Proceedings of the 22nd International Conference on Architectural Support for Programming Languages and Operating Systems, Apr. 4, 2017, 14 pages.
GB Search and Examination Report issued in the United Kingdom Application No. GB1812820.7, dated Mar. 22, 2019, 7 pages.
International Search Report and Written Opinion issued in international Application No. PCT/US2018/045974, dated Nov. 21, 2018, 16 pages.
Jouppi et al. "In-datacenter performance analysis of a tensor processing unit," Proceedings of the 44th annual International Symposium on Computer Architecture, Jun. 24, 2017, 12 pages.
Kim et al. "A novel zero weight/activation-aware hardware architecture of convolutional neural network," Proceedings of the 2017 Conference & Exhibition on Design, Automation & Test in Europe, Mar. 27, 2017, 6 pages.
Kota et al. "BRein memory: a 13-layer 4.2 k neuron/0.8 M synapse binary/ternary reconfigurable in-memory deep neural network accelerator in 65 nm CMOS," Digest of Technical Paper os the 2017 Symposium on VLSI Circuits, Jun. 5, 2017, 2 pages.
Moons et al. "An energy-efficient precision-scalable ConvNet processor in 40-nm CMOS," IEEE Journal of Solid-State Circuits, vol. 52, No. 4, Dec. 29, 2016, 12 pages.
Murmann. "Mixed-signal circuits for embedded machine-learning application," Proceedings of the 49th ASILOMAR Conference on Signals, Systems, and Computers, Nov. 8, 2015, 5 pages.
Partial European Search Report issued in European Application No. 16207511.3, dated Jun. 5, 2018, 17 pages.
TW Office Action in Taiwan Application No. 107127941, dated Jun. 28, 2019, 13 pages (with English translation).
JP Office Action in Japanese Application No. 2019-568100, dated Jun. 29, 2021, 9 pages (with English translation).
IN Office Action in Indian Application No. 201947049670, dated Jul. 14, 2021, 6 pages (with English translation).
CN Office Action in Chinese Application No. 201810908471.0 dated May 28, 2021, 38 pages (with English translation).
TW Office Action in Taiwan Application No. 109102859, dated Dec. 1, 2020, 9 pages (with English translation).

* cited by examiner

NEURAL NETWORK ACCELERATOR WITH PARAMETERS RESIDENT ON CHIP

CROSS-REFERENCE TO RELATED APPLICATIONS

This application is a continuation of U.S. application Ser. No. 16/059,686, filed on Aug. 9, 2018, which claims the benefit under 35 U.S.C. § 119(e) of the filing date of U.S. Provisional Application No. 62/544,171, filed on Aug. 11, 2017. The disclosures of the prior applications are considered part of and are incorporated by reference in the disclosure of this application.

BACKGROUND

This specification generally relates to a neural network (NN) compute tile for computation of Deep Neural Networks ("DNN") layers.

SUMMARY

In general, one innovative aspect of the subject matter described in this specification can be embodied in storing the parameters of a neural network on an accelerator. Neural networks depart from typical computational workloads in that their working set, i.e., the total amount of storage required for the whole computation, is actually limited. This working set largely corresponds to the number of parameters, typically from a few hundred thousand to a few billion. This storage quantity is compatible with existing hardware storage technologies.

Despite these facts, current accelerators contain a local storage for parameters through which the parameters transit, e.g., the parameters do not reside permanently on chip. Rather parameters stream from external memory for each new inference.

The external memory bandwidth is thus a key limitation of all neural network (NN) accelerators. Embodiments described in this specification replace the transitory local storage for parameters with an on-chip storage for parameters, i.e., embodiments keep all the parameters of the NN resident in the accelerator, and no longer stream them from external memory.

The benefits of storing the parameters on-chip include: overcoming performance limitations of NN accelerators; facilitating an increase in the number of multiply accumulate ("MAC") operators dramatically because performance limitations have been overcome; and providing lower-power neural network accelerators because external memory accesses typically require at least an order of magnitude more energy than local memory accesses.

In certain embodiments, the accelerator includes a computing unit. The computing unit includes: a first memory bank for storing input activations or output activations; a second memory bank for storing neural network parameters used in performing computations, the second memory bank configured to store a sufficient amount of the neural network parameters on the computing unit to allow for latency below a specified level with throughput above a specified level for a given NN model and architecture; at least one cell including at least one MAC operator that receives parameters from the second memory bank and performs computations; a first traversal unit in data communication with at least the first memory bank, the first traversal unit configured to provide a control signal to the first memory bank to cause an input activation to be provided to a data bus accessible by the MAC operator; and wherein the accelerator performs one or more computations associated with at least one element of a data array, the one or more computations being performed by the MAC operator and including, in part, a multiply operation of the input activation received from the data bus and a parameter received from the second memory bank. If the storage for parameters is sufficient to hold all neural network parameters, the performance of the accelerator won't be determined by the memory bandwidth. In that case, it is possible to feed all MACs with parameters every cycle.

Another innovative aspect of the subject matter described in this specification can be embodied in a computer-implemented method for accelerating tensor computations. The computer-implemented method includes: sending, by a first memory bank, a first input activation in response to the first memory bank receiving a control signal, wherein the first input activation is transmitted by a data bus; receiving, by at least one MAC operator, one or more parameters from a second memory bank for storing neural network parameters used in performing computations, the second memory bank storing a sufficient amount of the neural network parameters on the computing unit to allow for latency below a specified threshold and throughput above a specified threshold for a given NN model and architecture; and performing, by the MAC operator, one or more computations associated with at least one element of a data array, wherein the one or more computations comprise, in part, a multiply operation of at least the first input activation accessed from the data bus and at least one parameter received from the second memory bank.

Another innovative aspect of the subject matter described in this specification can be embodied in a method for accelerating computations. The method includes: prior to execution, loading neural network weight parameters into a neural network accelerator; and during execution, processing inputs to the accelerator substantially without accessing neural network weight parameters external to the accelerator. The method can further include: loading neural network weight parameters into multiple tightly connected accelerator dies if the number of neural network weight parameters is too large to fit on a single accelerator die; and processing inputs to the accelerator dies substantially without accessing neural network weight parameters external to the tightly connected accelerator dies.

The subject matter described in this specification can be implemented in particular embodiments so as to realize one or more of the following advantages. Using registers to keep track of memory address values allow a program to iterate deeply-nested loops with one instruction. A tensor accessible from narrow memory and wide memory units, in a single compute tile, is traversed based on memory address values retrieved from registers. Memory address values correspond to elements of the tensor. Tensor computations occur in individual compute tiles based on execution of deep loop nests. Computations can be distributed across multiple tiles. Computational efficiency is enhanced and accelerated based on distributing tensor computations for a multilayer neural network across several compute tiles. Tensors can be traversed and tensor computations can be performed with a reduced number of instructions.

Embodiments described in this specification have an impact on Neural Network (NN) accelerator operation and design. Embodiments work on one of the notable limitations of neural network accelerator designs, the combination of low latency and high throughput. Putting the parameters resident on the chip dramatically reduces latency given a high throughput and a given NN model and architecture. The accelerator doesn't need high memory bandwidth and energy goes down.

Having a tile arrangement as described in this specification provides compile type locality. For example, putting fully-connected models next to the SRAM results in greater internal bandwidth versus a cache model. Embodiments described in this specification operate faster than conventional neural network accelerators. Certain embodiments have more operators; in order to feed the operators the accelerators need more internal bandwidth. To address this need the architecture distributes memory and brings the parameters onto the accelerator.

The subject matter described in this specification can also be implemented in particular embodiments so as to realize other advantages. For example, by employing a memory hierarchy that couples a narrow low bandwidth memory with a high bandwidth wide memory, high utilization of the MAC operators can be achieved for DNN layers of very different dimensions and locality. The narrow low bandwidth memory can allow addressing flexibility to traverse a multi-dimensional array in any order.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
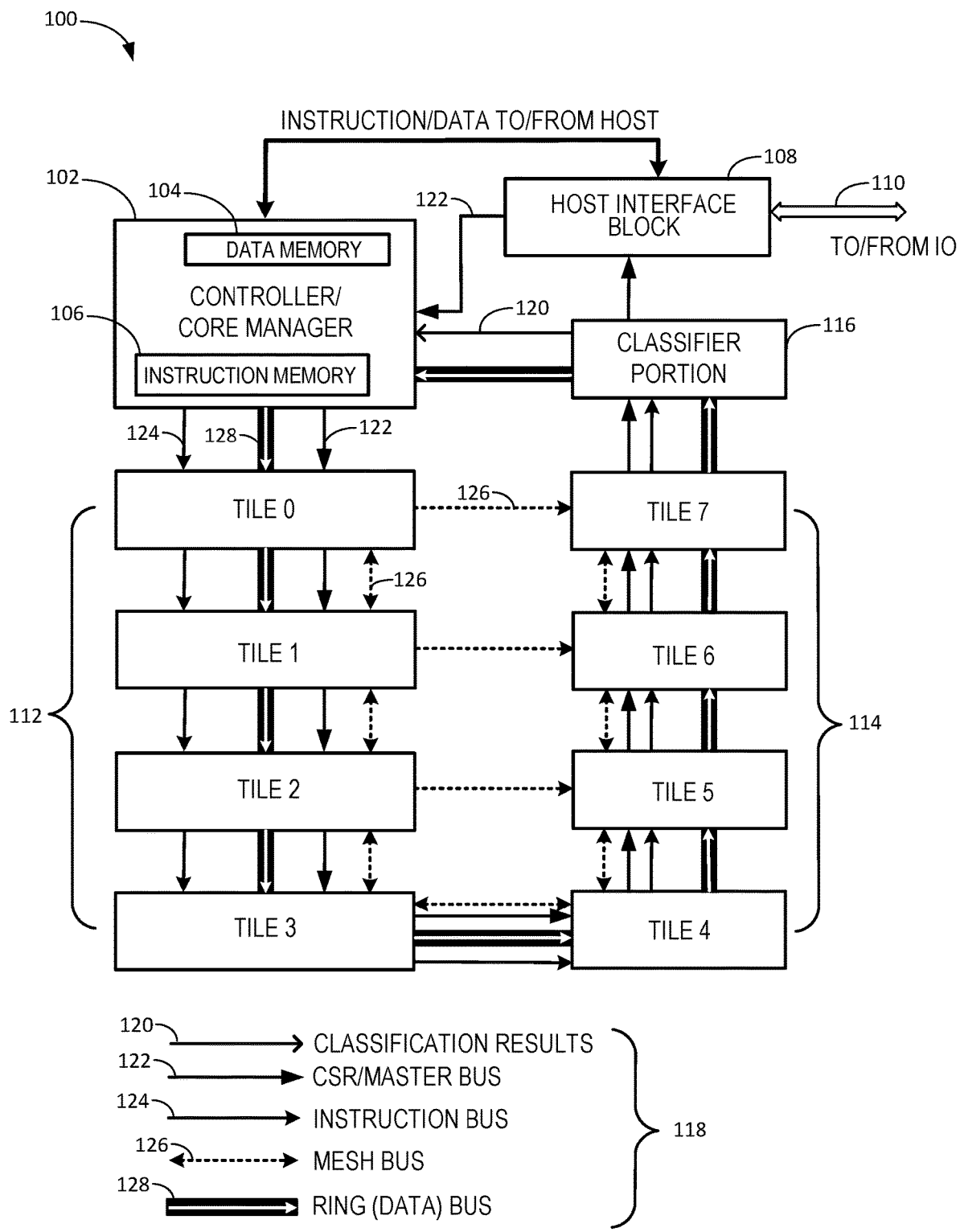
FIG. 1 is a block diagram of an example computation system.

The subject matter described in this specification relates to a method for accelerating computations. The method includes, prior to execution, loading neural network weight parameters into a neural network accelerator and, during execution, processing inputs to the accelerator substantially without accessing neural network weight parameters external to the accelerator. The method can further include loading neural network weight parameters into multiple tightly connected accelerator dies if the number of neural network weight parameters is too large to fit on a single accelerator die; and processing inputs to the accelerator dies substantially without accessing neural network weight parameters external to the tightly connected accelerator dies.

The subject matter described in this specification also relates to a hardware computing system including multiple computing units configured to accelerate machine learning inference workloads of a neural network layer. Each computing unit of the hardware computing system is self-contained and can independently execute computations required by a given layer of a multi-layer neural network. This specification generally relates to a neural network (NN) compute tile for computation of Deep Neural Networks ("DNN") layers with parameters resident on chip to allow for latency below a specified level with throughput above a specified level for a given NN model and architecture.

A neural network having multiple layers can be used to compute inferences. For example, given an input, the neural network can compute an inference for the input. The neural network computes this inference by processing the input through each of the layers of the neural network. In particular, the layers of the neural network each have a respective set of weights. Each layer receives an input and processes the input in accordance with the set of weights for the layer to generate an output.

Therefore, in order to compute an inference from a received input, the neural network receives the input and processes it through each of the neural network layers in order to generate the inference, with the output from one neural network layer being provided as input to the next neural network layer. Data inputs or outputs associated with a neural network layer, e.g., either the input to the neural network or the outputs of the layer below the layer in the sequence, can be referred to as activation for the layer.

In some implementations, the layers of the neural network are arranged in a sequence. In other implementations, the layers are arranged in a directed graph. That is, any particular layer can receive multiple inputs, multiple outputs, or both. The layers of the neural network can also be arranged such that an output of a layer can be sent back as an input to a previous layer.

The hardware computing system described in this specification can perform the computation of a neural network layer by distributing tensor computations across multiple compute tiles. A computation process performed within a neural network layer may include a multiplication of an input tensor including input activations with a parameter tensor including weights. The computation includes multiplying an input activation with a weight on one or more cycles and performing an accumulation of a product over many cycles.

A tensor is a multi-dimensional geometric object and example multi-dimensional geometric objects include matrices and data arrays. In general, a process is executed by a computing tile to perform tensor computations by processing a nested loop to traverse an N-dimensional tensor. In one example computational process, each loop may be responsible for traversing a particular dimension of the N-dimensional tensor. For a given tensor construct, a compute tile may require access to an element of a particular tensor to execute a plurality of dot product computations associated with the tensor. Computation occurs when an input activation provided by a narrow memory structure is multiplied with a parameter or weight provided by a wide memory structure. Because the tensor is stored in a memory, a set of tensor indices may require translation to a set of memory addresses. In general, a tensor traversal unit of a compute tile executes control operations that provide the index of each dimension associated with the tensor and order in which index elements are traversed to perform computations. Tensor computations end when multiplication results are written to an output bus and stored in memory.

FIG. 1 shows a block diagram of an example computing system 100 for accelerating tensor computations associated with deep neural networks (DNNs). The system 100 generally includes a controller 102, a host interface 108, an input/output (I/O) link 110, multiple tiles including a first tile set 112 and a second tile set 114, a classifier portion 116, and data buses identified in a bus map 118 (which is shown for clarity, but is not included in the system 100). Controller 102 generally includes data memory 104, instruction memory 106, and at least one processor configured to execute one or more instructions encoded in a computer readable storage medium. Instruction memory 106 may store one or more machine readable instructions that are executable by the one or more processors of controller 102. Data memory 104 may be any of a variety of data storage mediums for storing and subsequently accessing a variety of data relating to computations that occur within system 100.

Controller 102 is configured to execute one or more instructions relating to tensor computations within system 100, including instructions stored in instruction memory 106. In some implementations, data memory 104 and instruction memory 106 are volatile memory unit or units. In some other implementations, data memory 104 and instruction memory 106 are non-volatile memory unit or units. Data memory 104 and instruction memory 106 may also be another form of computer-readable medium, such as a floppy disk device, a hard disk device, an optical disk device, or a tape device, a flash memory or other similar solid state memory device, or an array of devices, including devices in a storage area network or other configurations. In various implementations, controller 102 may also be referenced or referred to as core manager 102.

As depicted, host interface 108 is coupled to I/O link 110, controller 102, and classifier portion 116. Host interface 108 receives instructions and data parameters from I/O link 110 and provides instructions and parameters to controller 102. In general, instructions can be provided to one or more devices in system 100 through instruction bus 124 (described below) and parameters can be provided to one or more devices in system 100 through ring bus 128 (described below). In some implementations, instructions are received by controller 102 from host interface 118 at an initial time and stored in instruction memory 106 for execution by controller 102 at a later time.

Classifier portion 116 is likewise coupled to controller 102 and tile 7 of second tile set 114. In some implementations, classifier portion 116 is implemented as a separate tile within the system 100. In alternative implementations, classifier portion 116 is disposed or located within controller 102 as a sub-circuit or sub-device of controller 102. Classifier portion 116 is generally configured to perform one or more functions on accumulated pre-activation values that are received as outputs of fully connected layers. Fully connected layers may be partitioned across the tiles in tile sets 112 and 114. Thus, each tile is configured to produce a subset of pre-activation values (i.e., linear outputs) which may be stored in a memory unit(s) of the tile. Classification results bus 120 provides a data path from classifier portion 116 to controller 102. Data that includes post-function values (i.e., results) are provided to controller 102 from classifier portion 116 via classification results bus 120.

Bus map 118 shows data buses that provide one or more inter-connected data communication paths between tiles of first tile set 112 and second tile set 114. Bus map 118 provides a legend for identifying a classification results bus 120, CSR/master bus 122, instruction bus 124, mesh bus 126, and ring bus 128 as depicted in FIG. 1. In general, a tile is a core component within the accelerator architecture of system 100 and is the focal point for tensor computations that occur in the system. Each tile is an individual computing unit that cooperates with other tiles in the system to accelerate computations across one or more layers of a multi-layer neural network. Although tiles in tile sets 112, 114 can share execution of tensor computations associated with a given instruction, an individual computing unit is a self-contained computational component configured to execute a subset of tensor computations independently relative to other corresponding tiles within tile sets 112, 114.

CSR bus 122 is a single master multiple slave bus that enables controller 102 to transmit one or more instructions that set program configurations and read status registers associated with one or more tiles. CSR bus 122 may be connected in a single daisy chain configuration with one master bus segment and multiple slave bus segments. As shown in FIG. 1, CSR bus 122 provides communications coupling through a bus data path that connects tiles in tile sets 112, 114 and controller 102 in a ring to host interface 110. In some implementation, host interface 110 is the single master of the CSR bus ring and the entire CSR bus address space is memory mapped to a memory space in host interface 110.

CSR bus 122 may be used by host interface 110 to perform one or more operations including, for example, programming memory buffer pointers in controller 102 to enable controller 102 to begin fetching instructions from instruction memory 106, updating/programming various tile settings (e.g., coefficient tables for polynomial approximation calculations) that remain static during one or more computations, and/or loading/reloading firmware to classification portion 116. In one example, firmware reloads may include new functions to be applied to linear outputs (i.e., pre-activation values). Accordingly, every slave having access to CSR bus 122 will have a distinct node identifier (node ID) that is tied to the slave and identifies it. The node ID will be part of an instruction address and will be used, inspected or otherwise examined by the CSR slaves (i.e., controller 102, tiles 112, 114 and classifier 116) to determine whether the CSR packet is addressed to the slave.

In some implementations, one or more instructions can be transmitted by host interface 102 through controller 102. The instructions may, for example, be 32-bits wide with the first 7-bits including header information indicating the instruction address/destination that is to receive and execute the instructions. The first 7-bits of the header may contain data parameters that represent a particular node ID. Slaves (e.g., each tile) on the CSR bus ring may therefore inspect the header of the instruction to determine if the request by the master (host interface 110) was addressed to the tile inspecting the header. If the node ID of the header does not indicate that the destination is the inspecting tile, the inspecting tile will copy the input CSR instruction packet to the CSR bus input connected to the next tile for inspection by the next tile.

Instruction bus 124 originates from controller 102 and, similar to CSR bus 122, also provides communications coupling through a bus data path that connects tiles in tile sets 112, 114 in a ring back to controller 102. In one implementation, controller 102 broadcasts one or more instructions via instruction bus 124. The instructions that are broadcast by controller 102 may differ from the instructions provided via CSR bus 122. However, the manner in which a tile receives and/or consumes or executes the instruction received via bus 124 may be similar to the process for executing instructions received via CSR bus 122.

In one example, a header (i.e., a bitmap) of the instruction indicates, to a receiving tile, that the receiving tile needs to consume a particular instruction based on a bitmap associated with the instruction. The bitmap may have a particular width defined in terms of bits. The instruction is typically forwarded from one tile onto the next tile based on parameters of the instruction. In one implementation, the width of instruction bus 124 may be configured to be smaller than the size/width of the instruction. Thus, in such a configuration, transmission of the instructions will be over several cycles and bus stops of instruction bus 124 will have decoders to place instructions received at the tile in the appropriate target instruction buffer associated with that tile.

As described further below, the tiles in tile sets 112, 114 are generally configured to support two broad categories of instructions. The two broad categories may also be referred to as instruction types. The instruction types include a tensor operation (TensorOp) instruction and a direct memory access (DMAOp) instruction. In some implementations, DMAOp instructions have one or more specializations that are allowed to be concurrent. The one or more specializations may be referred to as DMAOp instruction subtypes or opcodes. In some cases, every unique and/or valid DMAOp instruction type/subtype tuple will have a separate instruction buffer within a particular tile.

At a particular tile of tiles 112, 114, the bus stop associated with instruction bus 124 will examine the header bitmap to determine the instruction type/subtype. The instruction may be received by the tile and subsequently written to an instruction buffer of the tile prior to execution of the instruction by the tile. The instruction buffer of the tile in which the instruction is written to may be determined by the type and subtype indicator/field of the instruction. The instruction buffers may include a first-in first-out (FIFO) control scheme that prioritizes consumption of one or more related instructions. Thus, under this FIFO control scheme, instructions of the same type/subtype will always be executed in the order in which the instruction arrived on the instruction bus.

The different instruction buffers within a tile are the TensorOp instruction buffers and the DMAOp instruction buffers. As indicated above, instruction types include the TensorOp instruction and the DMAOp instruction. With regard to DMAOp instructions, instruction subtypes (indicating a 'write-to' buffer location) include the following: 1) mesh inbound instruction buffer; 2) mesh outbound instruction buffer; 3) narrow-wide DMA instruction buffer; 4) wide-narrow DMA instruction buffer; and 5) ring bus DMA instruction buffer. These buffer locations will be described in more detail below with reference to FIG. 2. Wide and narrow designations are used throughout the specification and generally refer to an approximate size in width (bits/bytes) of one or more memory units. As used herein, "narrow" may refer to one or more memory units each having a size or width of less than 16-bits and "wide" may refer to one or more memory units each having a size or width of between 16-bits and 64-bits.

Mesh bus 126 provides a data communications path that is distinct from CSR bus 122, instruction bus 124, and ring bus 128 (described below). As depicted in FIG. 1, mesh bus 126 provides a communications path that couples or connects each tile to its corresponding neighbor tile in both the X and Y dimensions. In various implementations, mesh bus 126 may be used to transport input activation quantities between one or more narrow memory units in adjacent tiles. As shown, mesh bus 126 does not allow direct forwarding of input activation data to non-adjacent tiles.

In various implementations, mesh bus 126 and the various tiles connected via mesh bus 126 may have the following configuration. Four corner tiles of the mesh have two outbound ports and two inbound ports. Four edge tiles of the mesh have three inbound ports and three outbound ports. All non-edge, non-corner tiles have four inbound ports and four outbound ports. In general, given an example N×N tile layout, edge tiles are tiles with only three neighbor tiles while corner tiles are tiles with two neighbor tiles. Regarding data flow methodology via mesh bus 126, in general, every input activation that arrives via mesh bus 126 for a particular tile must be committed to one or more narrow memory units of the tile. Moreover, for tile configurations that have fewer than four inbound ports, DMAOp instructions may write zero values to the locations in the tile's narrow memory instead of waiting for data on an absent input port. Likewise, for tile configurations that have fewer than four outbound ports, DMAOp instructions will not execute the narrow memory reads and port writes related to transfers for any absent ports.

In some implementations, a location or address of a narrow memory unit(s) that a particular input activation will be written to, or read from, will be generated by a Tensor Traversal Unit (hereinafter "TTU") based on inbound/outbound DMAOp provided via mesh bus 126. An inbound DMAOp and an outbound DMAOp may be executed concurrently and any required synchronization will be managed through sync flag control schemes administered by controller 102. TTUs are described in further detail below with reference to FIG. 2 and FIG. 3.

Ring bus 128 originates from controller 102 and, similar to CSR bus 122 and instruction bus 124, also provides communications coupling through a bus data path that connects tiles 112, 114 in a ring back to controller 102. In various implementations, ring bus 128 generally connects or couples all wide memory units (described in more detail below with reference to FIG. 2) in all tiles 112, 114. Thus, a payload width of ring bus 128 corresponds to the width of the wide memory units disposed within each tile of tile sets 112, 114. As discussed above, ring bus 128 also includes a bitmap header indicating the tiles that need to consume payload data comprising instructions or parameters communicated via ring bus 128.

With regard to data (i.e., payload) received at a particular tile via ring bus 128, in response to receiving the information, each tile will zero (i.e., clear out) position data indicated in the bitmap header that is unique to the receiving tile before forwarding the data onto another tile. Hence, when the header bitmap has no remaining bit set data indicating a particular tile that is to receive the payload, forwarding of the payload to another tile will stop. Payload data generally refers to activations and weights used by one or more tiles during tensor computations performed based on execution of deeply nested loops.

In some implementations, controller 102 may be described as being a part of ring bus 128. In one example, for DMAOp instructions executed within a particular tile, controller 102 may be used to pop the data/payload from ring bus stops and forward the payload to a ring bus stop in a next tile in the ring. Controller 102 may also cause the payload data to be committed to one or more wide memory units of the tile if such action is required by instructions in the bitmap header. The address of the one or more wide memory units to which the data needs to be written may be generated by DMAOp instructions within the particular tile.

In various implementations, each tile of tile set 112, 114 can either be a producer of payload data or a consumer of payload data. When a tile is a producer of payload data the tile reads the data from one or more of its wide memory units and multicasts the data over ring bus 128 for consumption by one or more other tiles. When a tile is a consumer of payload data the tile receives and writes the data to one or more wide memory units within the tile and forwards the payload data for consumption by one or more other tiles. With regard to movement of payload data via ring bus 128, there typically will only be one producer/master of data on ring bus 128 at any given time. The DMAOp instruction execution order (e.g., FIFO control scheme) in all tiles will ensure there is only one producer/master of data on ring bus 128 at a given time.

In some implementations, controller 102 uses a sync flag control architecture to ensure there is only one producer/master of payload data on ring bus 128 at a given time. In one example, every write by a tile to a ring output will trigger an increment of the corresponding sync flag count. Controller 102 may examine the payload data to determine the number of data chunks or segments that comprise the payload. Controller 102 then monitors execution by the tile to ensure the expected number of data segments are forwarded and/or consumed by the tile before another tile executes in master mode.

An exception to ensuring there is only one producer/master of data on ring bus 128 at a given time occurs when there are local multicast groups connected via ring bus 128 that do not have an overlapping region on the ring bus. For example, tile 0 (master) may multicast (i.e., produce data) to a tile in Tile 0-Tile 3 grouping, while Tile 4 (master) may do the same to a tile in Tile 4-Tile 7 grouping. An important requirement of this dual master multicast methodology is that different multicast groups must not be allowed to see each other's data packets because packet overlap may occur and lead to one or more data computation errors.

As shown in FIG. 1, controller 102 provides a communications data path that couples or connects tiles in tile sets 112, 114 to I/O 110 and includes several core functions. The core functions of controller 102 generally include feeding one or more I/O input activations to tiles in tile sets 112, 114 feeding one or more input activations and parameters received from I/O 110 to the tiles, feeding one or more instructions received from I/O 110 to the tiles, sending I/O output activations to host interface 108, and serving as a ring stop for CSR bus 122 as well as ring bus 128. As described in more detail below, first tile set 112 and second tile set 114 each include multiple tiles that are used to perform one or more tensor computations that are executed based on a deep loop nest comprised of inner and outer loops.

System 100 generally operates as follows. Host interface 108 will provide one or more instructions to controller 102 that define direct memory access operations (DMAOp) that occur for a given computation. Descriptors associated with instructions fed to controller 102 will include information required by the controller to facilitate large scale dot product computations associated with multi-dimensional data arrays (tensors). In general, controller 102 receives, from host interface 108, input activations, tile instructions, and model parameters (i.e., weights) for executing tensor computations for a given layer of a neural network. Controller 102 may then cause the instructions to be multicast to tiles 112, 114 in a data flow manner defined by the instruction(s). As discussed above, tiles consuming an instruction may then initiate a broadcast of a new/subsequent instruction to another tile based on bitmap data in the instruction header.

With regard to data flow, input activations and parameters are transmitted to tiles of tile sets 112, 114 via ring bus 128. Each of tiles 112, 114 will store a subset of the input activations needed to compute a subset of output activations that are assigned to that particular tile. DMAOp instructions for a tile will cause the input activation to be moved from wide memory to narrow memory. Computation within a tile begins when required input activations, parameters/weights and computation instructions (TTU operations, memory addresses, etc.) are available in the tile. Computations occurring within a tile ends when MAC operators (described below) within a tile complete all dot product operations defined by the instruction set and pre-activation functions are applied to the results (i.e., output activations) of the multiplication operations.

Results of the one or more tensor computations include writing output activations of a compute layer to a narrow memory unit(s) of the tile performing the computation. For certain tensor computations, there will be a transfer of output edge activations to neighboring tiles via mesh bus 126. Transfer of output edge activations to neighboring tiles are required to compute output activations for a subsequent layer when computations span multiple layers. When computations for all layers are complete, a DMAOp will move final activations to classifier tile 116 through ring bus 128. Controller 102 will then read final activations from classifier tile 116 and execute a DMAOp to move the final activations to host interface 108. In some implementations, classifier portion 116 performs computations of an output layer (i.e., the last layer) of the NN. In other implementations, the output layer of the NN is one of classifier layer, a regression layer, or another layer type that is generally associated with neural networks.

Figure 2:
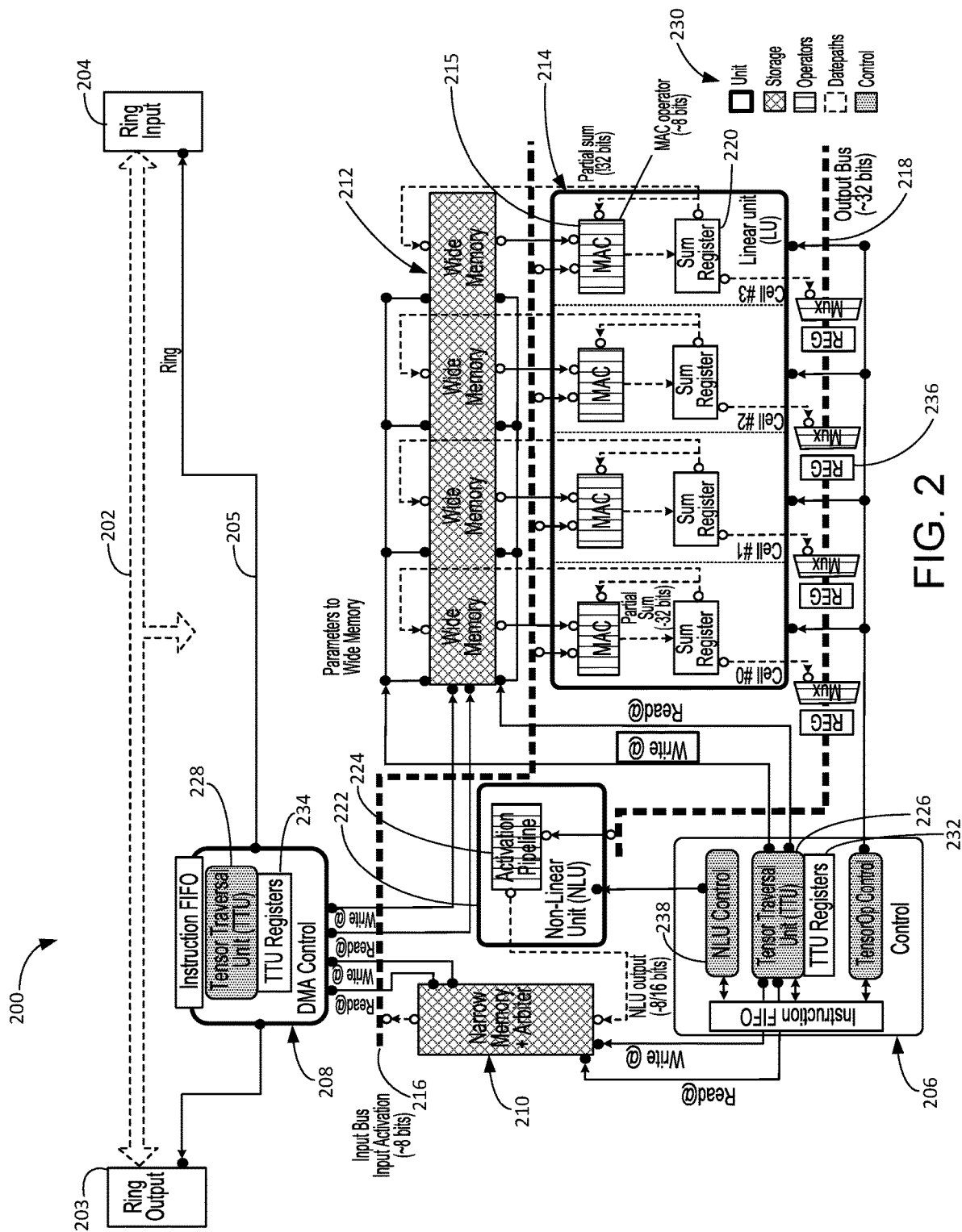
FIG. 2 illustrates an example neural network compute tile.

FIG. 2 illustrates an example neural network (NN) compute tile 200. Generally, the example tile 200 may correspond to any of the tiles within first tile set 112 and second tile set 114 discussed above with reference to FIG. 1. In various implementations, compute tile 200 may also be referenced or referred to as computing unit 200. Each compute tile 200 is a self-contained computational unit configured to execute instructions independently relative other corresponding tiles within tile sets 112, 114. As discussed briefly above, each compute tile 200 executes two types of instructions, a TensorOp instruction and a DMAOp instruction. In general, each instruction type will include compute operations associated with deep loop nests and thus each instruction type will generally execute over multiple time epochs to ensure completion of all loop iterations.

As discussed in more detail below, the different instruction types are executed by independent control units within compute tile 200 that synchronize on data through sync flag controls that are managed within compute tile 200. The sync flag controls manage concurrency between executions of different instruction types within compute tile 200. Each compute operation associated with each instruction type will be executed in strict order of issuance (i.e., First-In First-Out). With regard to the two instruction types, TensorOP and DMAOp, there are no ordering guarantees between these different instruction types and each type is treated by compute tile 200 as a separate thread of control.

With regard to data flow constructs, compute tile 200 generally includes data path 202 and data path 205 that each provide a communications path for data flow into and out of compute tile 200. As described above, system 100 includes three distinct data bus structures that are laid out in a ring configuration—CSR bus 122, instruction bus 124, and ring bus 128. Referring to FIG. 2, data path 205 corresponds to instruction bus 124, while data path 202 generally corresponds to one of CSR bus 122 and ring bus 128. As shown, data path 202 includes a ring output 203 providing an output path for data leaving compute tile 200 and a ring input 204 providing an input path for data entering compute tile 200.

Compute tile 200 further includes a TensorOp control 206 including a TensorOp tensor traversal unit (TTU) 226 and a DMAOp control 208 including a DMAOp TTU 228. TensorOp control 206 generally manages writes to and reads from TensorOp TTU register 232 and administers traversal operations for execution by TensorOp TTU 226. Likewise, DMAOp control 208 generally manages writes to and reads from DMAOp TTU register 234 and administers traversal operations for execution by DMAOp TTU 228. TTU register 232 includes instruction buffers for storing one or more instructions comprising operations to be performed by TensorOp TTU 226 upon execution of the instructions by TensorOp control 206. Likewise, TTU register 234 includes instruction buffers for storing one or more instructions comprising operations to be performed by TTU 208 upon execution of the instructions by DMAOp control 208. As described further below, TTUs are used by compute tile 200 to traverse array elements of one or more tensors that generally reside in narrow memory 210 and wide memory 212.

In some implementations, certain instructions for execution by compute tile 200 arrive at the tile via data path 205 (i.e., a portion of instruction bus 124). Compute tile 200 will examine the header bitmap to determine the instruction type (TensorOp or DMAOp) and the instruction subtype (read operation or write operation). Instruction(s) received by compute tile 200 are subsequently written to a particular instruction buffer depending on the instruction type. In general, instructions are received and stored (i.e., written to the buffer) prior to execution of the instruction by a component of compute tile 200. As shown in FIG. 2, the instruction buffers (i.e., TensorOp TTU register 232 and DMAOp TTU register 234) may each include a first-in first-out (FIFO) control scheme that prioritizes consumption (execution) of one or more related instructions.

As discussed briefly above, a tensor is a multi-dimensional geometric object and example multi-dimensional geometric objects include matrices and data arrays. An algorithm, including deeply nested loops, may be executed by compute tile 200 to perform tensor computations by iterating one or more nested loops to traverse an N-dimensional tensor. In one example computational process, each loop of the loop nest may be responsible for traversing a particular dimension of the N-dimensional tensor. As described herein, TensorOp control 206 generally administers one or more tensor operations that drive the sequence in which dimensional elements of a particular tensor construct are traversed and accessed to complete computations defined by the deep nested loops.

Compute tile 200 further includes a narrow memory 210 and a wide memory 212. Narrow and wide designations generally refer to a size in width (bits/bytes) of the memory units of narrow memory 210 and wide memory 212. In some implementations, narrow memory 210 includes memory units each having a size or width of less than 16-bits and wide memory 212 includes memory units each having a size or width or less than 32-bits. Generally, compute tile 200 receives input activations via data path 205 and DMA control 208 executes an operation to write the input activations into narrow memory 210. Likewise, compute tile 200 receives parameters (weights) via data path 202 and DMA control 208 executes an operation to write the parameters into wide memory 212. In some implementations, narrow memory 210 can include a memory arbiter typically used in shared memory systems to decide, for each memory cycle, which control device (e.g., TensorOp control 206 or DMAOp control 208) will be allowed to access that shared memory units of narrow memory 210.

Compute tile 200 further includes an input activation bus 216 and a MAC array 214 including multiple cells that each include a MAC operator 215 and a sum register 220. In general, MAC array 214 executes, using MAC operators 215 and sum registers 220 across multiple cells, tensor computations that include arithmetic operations relating to dot product computations. Input activation bus 216 provides a data path in which input activations are provided, by narrow memory 210, one-by-one for respective access by each MAC operator 215 of MAC array 214. Hence, based on the one-by-one broadcast of an input activation, a single MAC operator 215 of a particular cell will each receive an input activation. Arithmetic operations performed by the MAC operators of the MAC array 214 generally include multiplying an input activation provided by narrow memory 210 with a parameter accessed from wide memory 212 to produce a single output activation value.

During arithmetic operations, partial sums may be accumulated and stored in a corresponding, e.g., sum register 220, or written to wide memory 212 and re-accessed by a particular cell of MAC array 214 to complete follow-on multiply operations. The tensor computations can be described as having a first portion and second portion. The first portion is complete when multiply operations produce an output activation, for example, by completing a multiplication of an input activation and a parameter to generate the output activation. The second portion includes application of a non-linear function to an output activation and the second portion is complete when the output activation is written to narrow memory 210 after application of the function.

Compute tile 200 further includes an output activation bus 218, a non-linear unit (NLU) 222 comprising an output activation pipeline 224, an NLU control 238, and a reference map 230 that indicates a core attribute of a component in compute tile 200. Reference map 230 is shown for clarity, but is not included in the compute tile 200. Core attributes include whether a particular component is a unit, a storage device, an operator, a control device or a data path. In general, upon completion of the first portion of the tensor computations, output activations are provided from MAC array 214 to NLU 222 via output activation bus 218. After arrival at NLU 222, data specifying an activation function, received via activation pipeline 224 is applied to the output activations and the output activations are then written to narrow memory 210. In some implementations, output activation bus 218 includes at least one pipelined shift register 236 and completing the second portion of the tensor computations includes using a shift register 236 of activation bus 218 to shift output activations toward narrow memory 210.

With regard to dot product computations of, for example, two multi-dimensional data arrays, for a single compute tile 200, MAC array 214 provides robust single instruction multiple data (SIMD) functionality. SIMD generally means that all parallel units (multiple MAC operators 215) share the same instruction (based on the deep loop nest), but each MAC operator 215 executes the instruction on different data elements. In one basic example, adding the arrays [1, 2, 3, 4] and [5, 6, 7, 8] element-wise to obtain the array [6, 8, 10, 12] in one cycle will typically require four arithmetic units to execute the operation on each element. By using SIMD, the four units can share the same instruction (e.g., "add") and perform computations in parallel. Thus, system 100 and compute tile 200 provides enhanced acceleration and parallelism in tensor computations over prior methods.

In one example, and as described in more detail below, a single instruction can be provided by controller 102 to multiple compute tiles 200 (see tile sets 112, 114 of FIG. 1) for consumption by multiple MAC arrays 214. In general, neural network layers can include multiple output neurons and the output neurons can be partitioned such that tensor computations associated with a subset of output neurons can be assigned to a particular tile of tile sets 112, 114. Each tile of tile sets 112, 114 can then perform related tensor computations on different groups of neurons for a given layer. Compute tile 200 can therefore provide at least two forms of parallelism: 1) one form includes partitioning the output activations (corresponding to the subset of output neurons) amongst the multiple tiles of tile set 112, 114; and 2) another form includes simultaneous computation (with a single instruction) of multiple subsets of output neurons based on the partitioning amongst the tiles of tile sets 112, 114.

Figure 3:
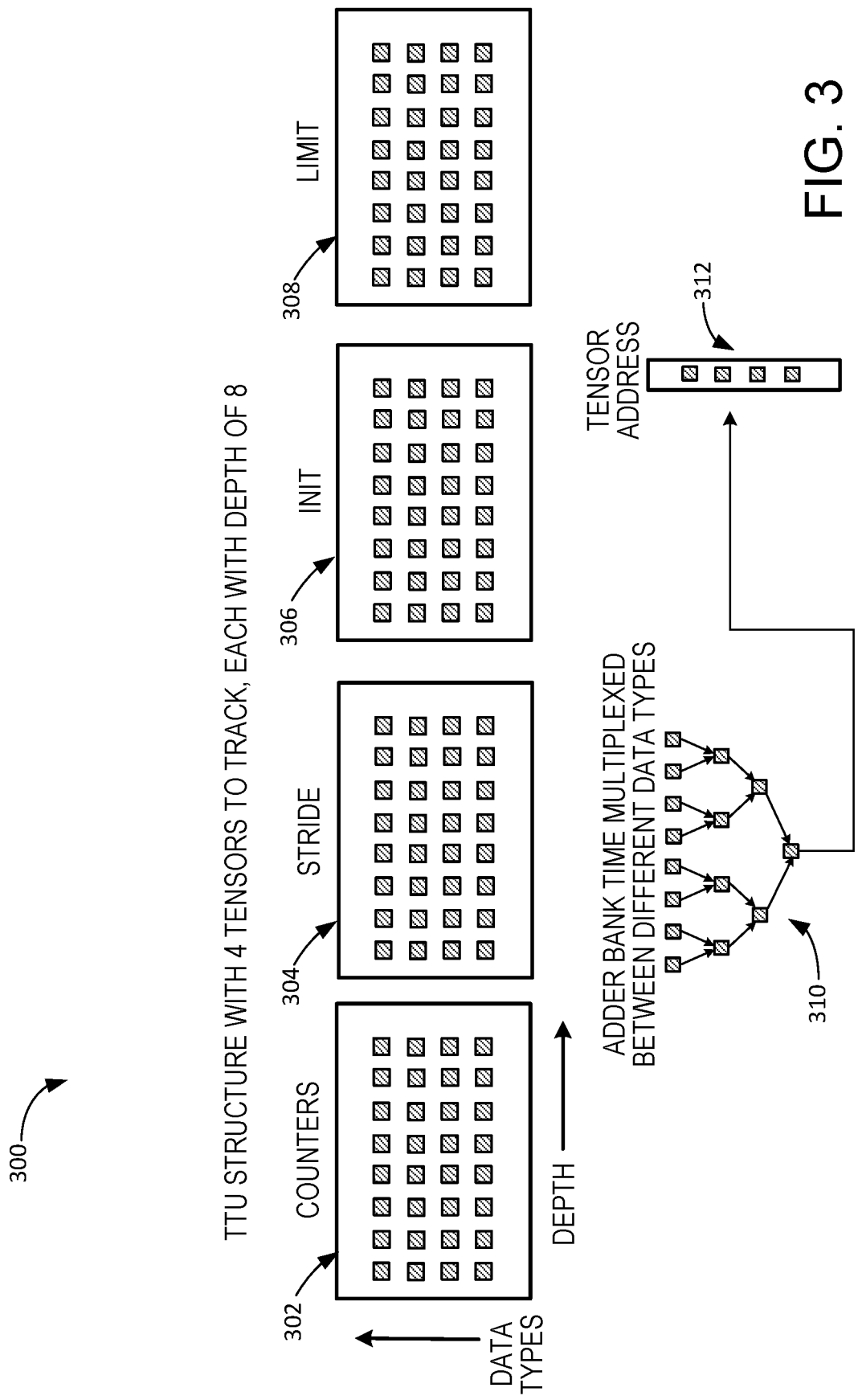
FIG. 3 illustrates an example Tensor Traversal Unit (TTU) structure.

FIG. 3 illustrates an example Tensor Traversal Unit (TTU) structure 300 comprising four tensors to track each having a depth of eight. TTU 300 generally includes a counters tensor 302, a stride tensor 304, an init tensor 306, and a limit tensor 308. TTU 300 further includes an adder bank 310 and a tensor address index 312. As described above, a tensor is a multi-dimensional geometric object and to access an element of the tensor, an index of each dimension must be provided. Because the tensor is stored in narrow memory 210 and wide memory 212, a set of tensor indices must be translated to a set of memory addresses. In some implementations, translation of the indices to memory addresses is done by making the memory addresses a linear combination of the indices and reflecting addresses via tensor address index 312.

There is a TTU per control thread and there is a control thread per instruction type (TensorOP and DMAOp) in compute tile 200. Accordingly, as discussed above, there are two sets of TTUs in compute tile 200: 1) TensorOp TTU 226; and 2) DMAOp TTU 228. In various implementations, TensorOp control 206 will cause TTU 300 to load TensorOp TTU counter 302, limit 308, and stride values 304 at the beginning of a particular tensor operation and will not change the register values before the instruction is retired. Each of the two TTUs will need to generate an address for the following memory address ports in compute tile 200: 1) wide memory 212 address ports, and 2) narrow memory 210 which has four independently arbitrated banks that are presented as four address ports.

As discussed above, in some implementations, narrow memory 210 can include a memory arbiter typically used in shared memory systems to decide, for each memory cycle, which control device (e.g., TensorOp control 206 or DMAOp control 208) will be allowed to access shared memory resources of narrow memory 210. In one example, the different instruction types (TensorOp and DMAOp) are independent control threads that request for memory access that need to be arbitrated. When a particular control thread commits a tensor element to memory, the control thread increments the counters 302 of the tensor reference that was committed to memory.

In one example, when TensorOp control 206 executes an instruction for accessing a particular element of a tensor, TTU 300 can determine the address of the particular element of the tensor, such that the control 206 may access the storage, for example, narrow memory 210 to read data representing an activation value of the particular element. In some implementations, a program may include a nested loop and control 206 may execute an instruction to access an element of a two-dimensional array variable within the nested loop according to current index variable values associated with the nested loop.

TTU 300 may hold traversal state for up to X number of TTU rows for a given tensor(s) at the same time. Each tensor that resides concurrently in TTU 300 occupies a dedicated hardware tensor control descriptor. The hardware control descriptor can consist of X number TTU counters 302 per row position, stride 304, and limit registers 308 that support tensors having up to X number TTU counters per row dimensions. In some implementations, the number of rows and the number of counters per row can be different.

For a given position register, the final memory address is computed from an addition operation that includes adding position registers together. The base address is incorporated into counter 302. One or more adders are shared for tensor references that reside in the same memory. In one implementation, because there can only be a single load/store on any given port in a cycle, it will be a function of the loop nest control to ensure that multiple tensor references that reside in the same narrow or wide memory do not have their counters incremented on any given cycle. The use of registers for computing memory access address values including the determination of offset values are described in greater detail in patent application Ser. No. 15/014,265 titled "Matrix Processing Apparatus," filed on Feb. 3, 2016, the entire disclosure of which is hereby expressly incorporated by reference in its entirety herein.

The following provides template parameters that may be used to instantiate a specialized TTU 300: 1) X Number of TTU Rows; 2) X Number of TTU Counters per Row; 3) X number of TTU Adder Units; 4) per TTU Row indicate shared Adder Reference; and 5) per Counter indicate X Counter Size [TTU][Row][Depth]. All TTU registers are architecturally visible. An address of a particular tensor element (i.e., tensor address 312) that needs to be accessed for the computation is the result of the addition of the counters. When an increment signal is issued from the control thread to a row of the TTU, TTU 300 executes a single cycle operation and increments an innermost dimension by a stride 304 of that dimension and propagates the rollover through all the depths.

In general, TTU 300 determines a status associated with one or more tensors. The status can include loop bound values, current loop index variable values, dimension multipliers for computing a memory address value, and/or program counter values for handling branch loop bounds.

TTU 300 can include one or more tensor status elements and an arithmetic logic unit. Each of the tensor status elements may be a storage element, for example a register or any other suitable storage circuitry. In some implementations, the tensor status elements may be physically or logically arranged into different groups.

Figure 4:
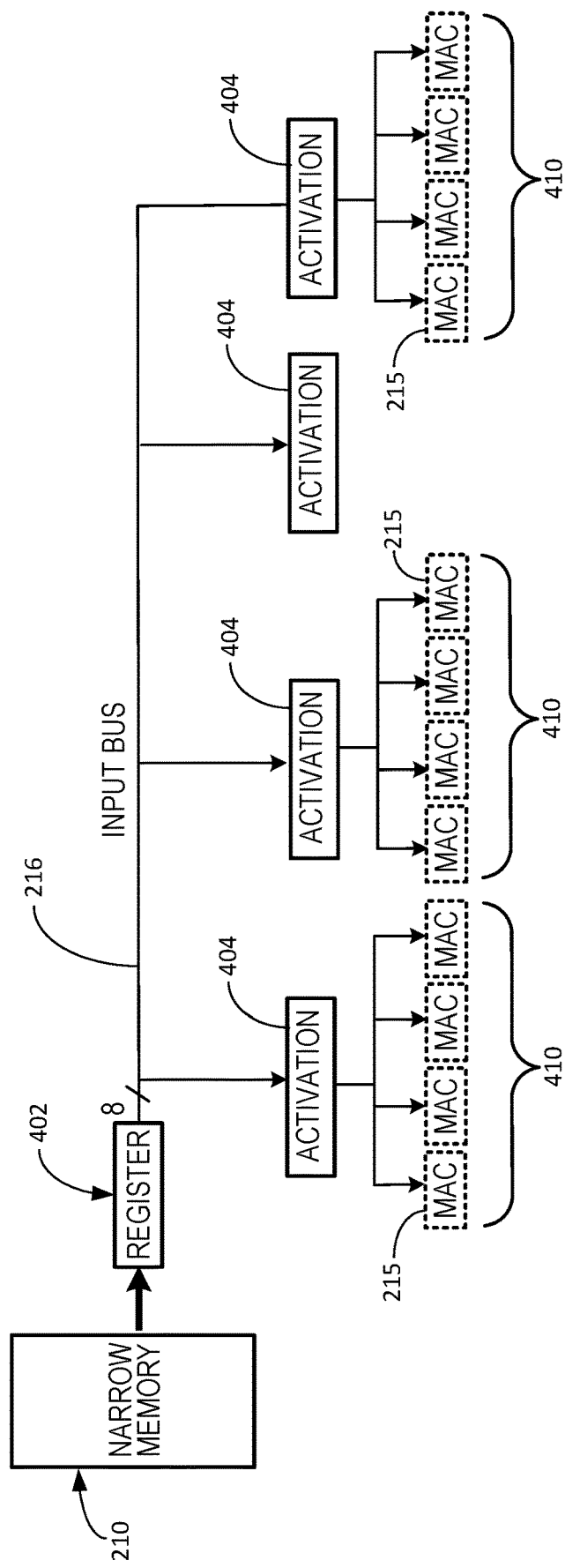
FIG. 4 illustrates an example architecture that includes a narrow memory unit providing input activations to one or more multiply accumulate (MAC) operators.

FIG. 4 illustrates an example architecture that includes a narrow memory 210 broadcasting activations 404 via input bus 216 to one or more multiply accumulate (MAC) operators. Shift register 404 provides a shift functionality whereby activations 404 are sent out one at a time unto input bus 216 for receipt by one or more MAC operators 215 in a MAC cell 410. In general, MAC cells 410, including MAC operators 215, can be defined as compute cells that calculate a partial sum and, in some implementations, are configured to write a partial sum datum to output bus 218. As shown, cells 410 may consist of one or more MAC operators. In one implementation, the number of MAC operators 215 in a MAC cell 410 is referred to as the issue width of the cell. As an example, a dual issue cell refers to a cell with two MAC operators that can compute the multiplication of two activation values (from narrow memory 210) with two parameters (from wide memory 212) and perform an addition between the results of the two multipliers and the current partial sum.

As described above, input bus 216 is a broadcast bus that provides input activations to MAC operators 215 of the linear unit (i.e., MAC array 214). In some implementations, the same input is shared between all MAC operators 215. The width of input bus 216 must be wide enough to supply the broadcast inputs to the corresponding number of cells for a given MAC array 214. Consider the following example to illustrate the structure of input bus 216. When the number of cells in the linear unit equals four and the activation width equals eight bits, input bus 216 can be configured to provide up to four input activations every cycle. In this example, every cell in MAC array 214 will only access one out of the four activations that are broadcast.

Based on TensorOp field settings of the instruction received by compute tile 200, cells of MAC array 214 may need to perform computations using the same input activation. This may be referred to as Zout partitioning within a cell of MAC array 214. Likewise, Zin partitioning within a cell occurs when cells of MAC array 214 need different activations to perform computations. In the former case, the single input activation is replicated four times and four activations read from narrow memory 210 are broadcast over four cycles. In the latter case, a read of narrow memory 210 is required every cycle. For the aforementioned example, TensorOp control 206 orchestrates this broadcast methodology based on execution of instructions received from controller 102.

Figure 5:
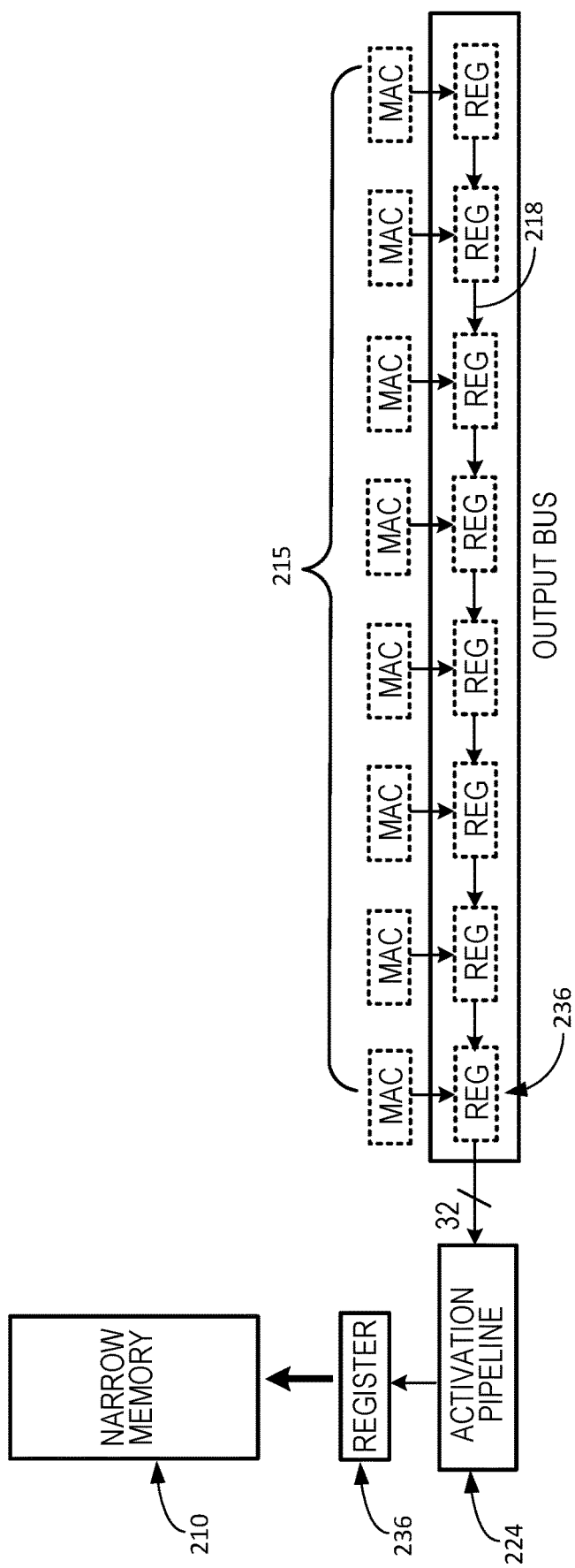
FIG. 5 illustrates an example architecture that includes an output bus providing output activations to the narrow memory unit of FIG. 2 and FIG. 4.

FIG. 5 illustrates an example architecture that includes an output bus 218 for providing output activations to a narrow memory unit 210 of FIG. 2 and FIG. 4. In general, every MAC cell 215 of MAC array 214 in compute tile 200 computes a different output activation. However, with regard to an output feature array, in cases where output feature depth is less than the number of MAC cells 215 in a compute tile 200, cells may be grouped to form one or more cell groups. All MAC cells 215 in a cell group compute the same output (i.e., for an output feature map), however each cell only computes a subset of the outputs, corresponding to a subset of the Zin dimension. As a result, the output of a MAC cell 215 is now a partial sum, not the final linear output. In some implementation, NLU 222 will aggregate these partial sums into the final linear output based on a control signal provided to NLU 222 by NLU control 238.

As discussed above, output bus 218 is a pipelined shift register. In various implementations, when a first portion of the tensor computations end and TensorOp control 206 indicates (by executing an instruction) that a partial sum needs to be written out, there will be a parallel load of partial sums that are provided to output bus 218. The number of parallel loads will correspond to the number of MAC cells in compute tile 200. TensorOp control 206 will then cause the partial sum quantities to be shifted out and sent through the non-linear pipeline. In some implementations, there may be circumstances in which not all MAC cells in a tile are actually utilized to perform computations. In such a circumstance, not all partial sums shifted onto the output bus will be valid. In this example, TensorOp control 206 may provide a control signal to MAC array 214 to indicate the number of valid cells that should be shifted out. The parallel load quantities loaded to output bus 218 will still correspond to the number MAC cells in the compute tile, however, only valid values will be shifted out and committed to narrow memory 210.

Figure 6:
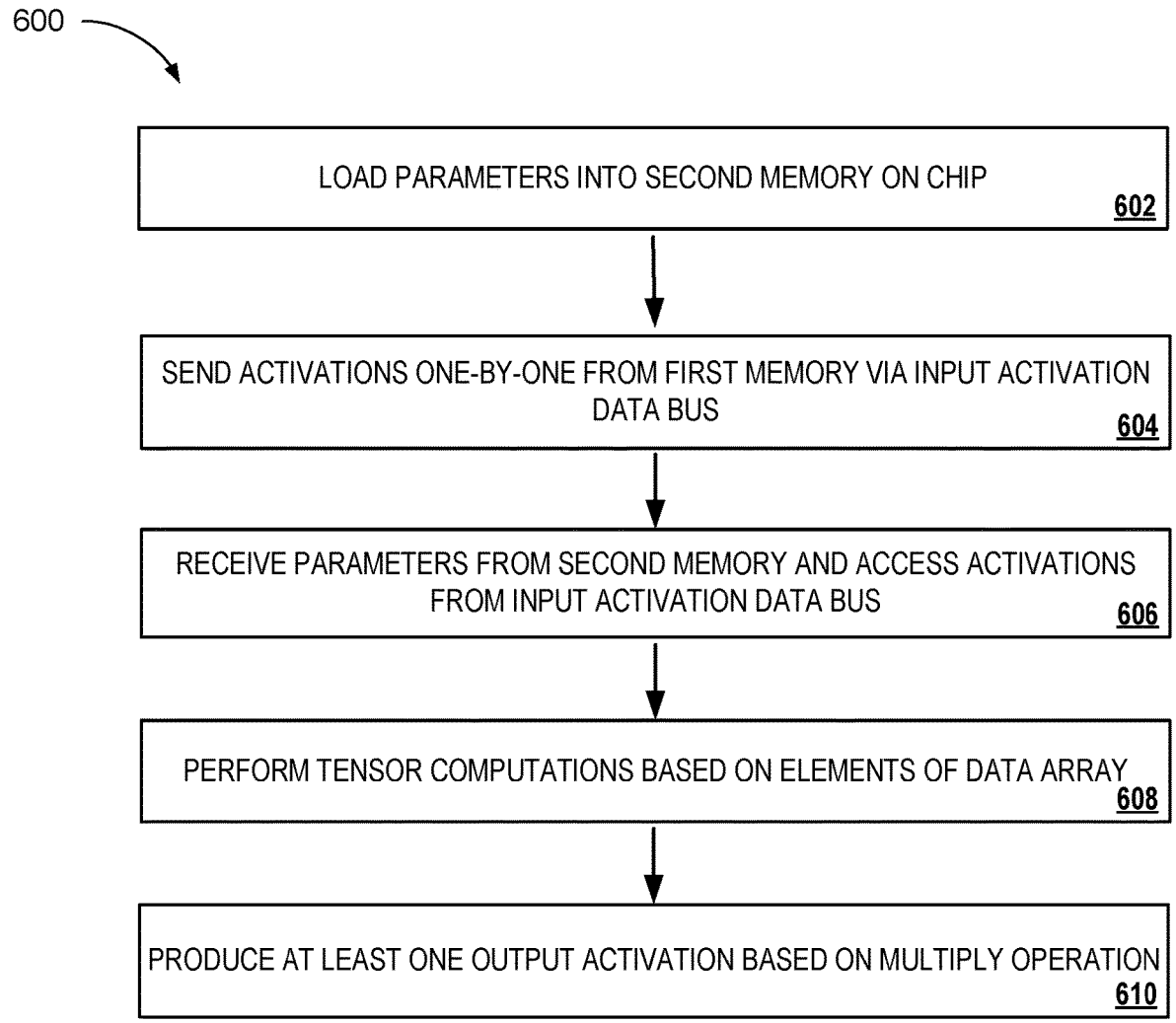
FIG. 6 is an example flow chart of a process for performing tensor computations using the neural network compute tile of FIG. 2.

FIG. 6 is an example flow-chart of process 600 for performing tensor computations using a neural network (NN) compute tile, such as the compute tile 200 of FIG. 2. Process 600 begins at block 602 by loading sufficient parameters into second memory on chip to allow for latency below a specified level and throughput above a specified level for a given NN model and architecture. Throughput: is the maximum performance achieved in the presence of a large number of requests/inferences. Latency is the minimum time taken to compute a single request. The process 600 continues at block 604 and narrow memory 210 of compute tile 200 sends (i.e., broadcasts) activations one-by-one onto input activation data bus 216. Activation values are stored in a narrow memory 210. Narrow memory 210 can be a collection of static random access memory (SRAM) banks that permit addressing to particular memory locations for accessing input quantities. The activations read from the memory 210 are broadcast, via input activation bus 216, to linear cells of MAC array 214 (i.e., Linear Unit) that comprise multiple MAC operators 215 and sum registers 220. At block 606 of process 600, MAC operators 215 of compute tile 200 each receive two inputs—one input (an activation) is received from input activation bus 216; and another input (a parameter) is received from wide memory 212. Accordingly, the activations feed one of the inputs of each MAC operator 215 and each MAC operator 215 in the cells of MAC array 214 get their second multiplier input from wide memory 212.

At block 608 of process 600, MAC array 214 of compute tile 200 performs tensor computations comprising dot product computations based on elements of a data array structure accessed from memory. Wide memory 212 can have a width in bits that is equal to the width of the linear unit (e.g., 32-bits). The linear unit (LU) is thus a SIMD vector arithmetic logic unit (ALU) unit that receives data from a vector memory (i.e., wide memory 212). In some implementations, MAC operators 215 may also get the accumulator inputs (partial sums) from wide memory 212 as well. In some implementations, there is time sharing relative to the wide memory 212 port for reads and/or writes relating to the two different operands (parameters and partial sum). In general, to optimize area, wide memory 212 may have a limited number of ports. As a result, when there is a need to read an operand (e.g., a parameter) from wide memory 212 and write an operand (e.g., a partial sum) to wide memory 212 at the same time, a pipeline associated with a particular operand can be stalled.

At block 610, a compute cell (having MAC operator 215 and sum register 220) of compute tile 200 produces at least one output activation based on multiply operations performed by the MAC/compute cell. The result of MAC cell operations include either partial sums that are written back to memory (during partial sum arithmetic operations) or output activations that are sent to output bus 218. NLU 222 of compute tile 200 can apply a non-linear activation function to the output activations and write the activations to narrow memory 210. In some implementations, output bus 218 is a shift register and may accumulate a parallel load of results/output activations from the MAC operator 215, and shift them out one at a time for application of the non-linear function and the write operation to narrow memory 210 of the same tile.

Embodiments described in the specification make use of the following two-pronged observation: 1) a bottleneck of most existing Neural Network (NN) accelerators is the memory bandwidth required to load the NN weights (also known as parameters); and 2) even though the number of parameters in production models is large, i.e., ranging from a few KB to a few GB, with most models ranging between a few MB to a few hundreds of MB, these numbers are within reach of what can be implemented in hardware including in on-chip memory, e.g., using memory distributed across tiles.

Just adding a large memory, e.g., a cache or scratchpad, on the die to contain all the parameters is not sufficient. The goal of overcoming the memory bandwidth limitation is to scale out the performance of the architecture. That means increasing the number of operators, typically MACs. But in order to achieve high performance, one must be able to feed these operators every cycle with parameters. It is also important to understand "performance" as not just throughput, but also latency, which is the case for many user-facing applications.

Stated another way, in a Neural Network (NN) accelerator, it is very costly to load parameters one layer at a time. If one can pre-load the parameters on the chip then all one needs to load is the activations at run time. In other words, embodiments include a large scale on-chip memory.

Embodiments described in this specification have an impact on Neural Network (NN) accelerator operation and design. Embodiments work on one of the notable limitations of neural network accelerator designs, the combination of low latency and high throughput. Consider that a NN accelerator is meant to represent a whole neural network. At the input is some data, e.g., a small image or sound. The NN accelerator executes the layers one after another. What is costly in terms of performance and energy is to load the parameters of the layer one after another. The NN accelerator loads the parameters of a layer, does the computation, keeps the output of the layer and then load the parameters of the next layer; it is in this process where most of the memory bandwidth is consumed.

Putting the parameters resident on the chip dramatically reduces latency given a high throughput and a given NN model and architecture. The accelerator only needs to load the few bytes of the sound then the accelerator can go extremely fast. The accelerator doesn't need high memory bandwidth and energy goes down.

Figure 8:
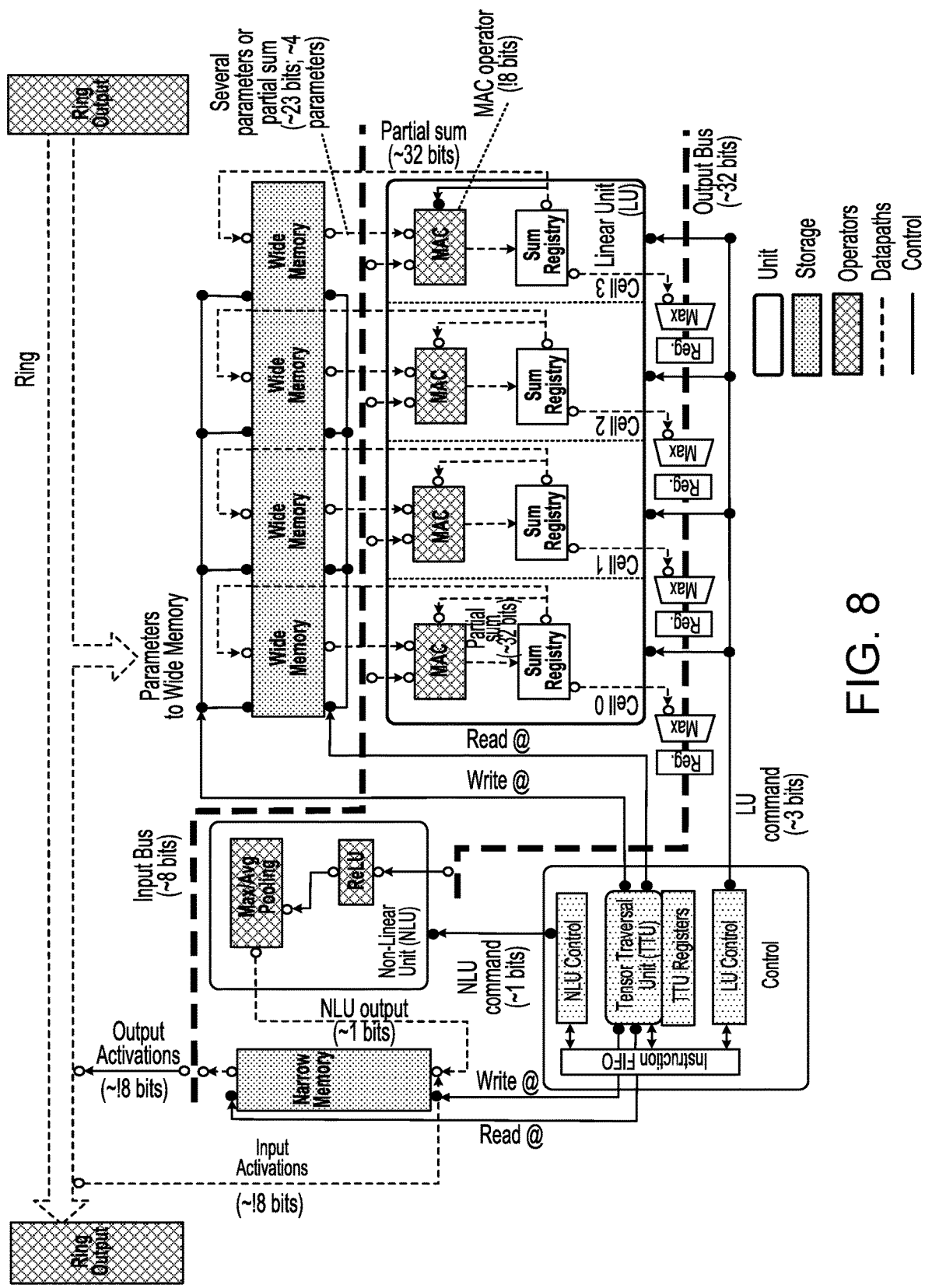
FIG. 8 is an alternative embodiment of a neural network compute tile.

The Von Neumann model, where the memory is loaded from memory to CPU, is a common architecture. Such a classic Von Neumann-like architecture where memory resides on one end of the die, and the computational operators on the other end of the die would be impractical, if not impossible, with a large number of operators, as it would imply a huge number of wires to route the data from the memory (or memory banks) to the operators. Instead embodiments of the invention leverage the memory locality properties of NN computations to arrange the architecture in a tiled organization (as shown in FIGS. 2 and 8), where the memory is distributed across the tiles.

NNs are large but not huge so one can get close to the point where one can effectively fit all the parameters of one or a few NNs on the chip. NN accelerators are moving to architectures that are self-contained. Given a tile architecture one can partition the memory inside the chip. Instead of having one large SRAM in one corner of the chip, embodiments allocate the right SRAM to every tile and avoid on-chip bandwidth issues as well. In certain embodiments a wide memory in each tile contains the parameters, and a wide ring (roughly of similar width as the wide memory) feeds the wide memories at a high bandwidth. Embodiments described in this specification contemplate architectural variations. Depending on NN layer properties, embodiments can have at least the following two NN architectures.

For neural networks largely composed of fully connected layers there is less reuse of the parameters across layers. Neurons in a fully connected layer have full connections to all activations in the previous layer. Consider a fully connected neural network where parameters are not reused (consider the case of no batch processing, e.g., real-time applications). If all parameters are not contained within the Wide Memories, the parameters have to be fetched from an external memory via a ring bus. In that case, the performance of the overall design becomes limited by the external memory bandwidth. If all the parameters reside in the wide memories, then no external memory access is required, and all operators can be fed with parameters every cycle, achieving maximum performance. Instead of using only external memory for fetching parameters, embodiments described in this specification keep the parameters resident in wide memory.

As an example, consider a model with 50M parameters (or 50 MB for the sake of simplicity) in fully connected layers. Consider an accelerator with 16384 MACs operating at 1 GHz. Consider that the input to the model is 16 KB. All values are reasonable for current applications. The maximum performance corresponds to executing the model in: $50*10^6/(16384*10^9)=3.05*10^{-6}$ seconds. That, in turn, corresponds to a memory bandwidth of $(50*10^6+16,384)/(3.05*10^{-6})=16.40$ TB/s. As a comparison point, typical DRAM chips provide around of the order of 10 GB/s, state-of-the-art high bandwidth memory (HBM) provide around 256 GB/s.

Convolutional neural networks pass parameters from one tile to another. For neural networks largely composed of convolution layers, where parameters are reused across neurons (also known as activations), the memory bandwidth requirements are less high, but still usually higher than a typical external memory. The ring bandwidth can be sufficient to load the parameters to the tile, provided it is connected to a large on-die memory of the same width as the ring. Stated a different way, for each inference, the tiles need to access/load all parameters of the model; this is true for any model. The only difference for fully connected layers in a neural network is that each parameter is only used once during one inference; for convolutional layers, the parameters are used multiple times within the layer.

As an example, consider a model with 50M parameters in convolution layers. Some of these layers can end up being quite small, others large, so reuse of the parameters will vary; a reasonable average across the model is ~100 reuses per parameter. So, using the same reasoning as above, the bandwidth requirement would drop to 16.40 TB/s/100~164 GB/s. Still the bandwidth requirement remains high for cost-effective DRAMs. However, with the above architecture, a 164*8=1312-bit wide ring connected to a large memory of the same width is able to service the tiles at the proper speed.

Consider a first embodiment in which the memory is large enough to contain all parameters of the layers in a fully connected model. If all tiles are to work simultaneously on one layer, the parameters need to be distributed across the tiles. Embodiments partition the output neurons/activations of each layer across the tiles; during execution, each tile processes a subset of the layer, computes the corresponding partial sum, and passes it to its neighbor, i.e., the partial sums rotate around the ring, and after a full rotation, the tiles produce the final sum.

A second embodiment includes preloading/caching the same subset of the (currently used) parameters in all tiles, as the tiles use the same parameters at the same time. During execution, the parameters (subset), not the partial activations sums, rotate around the ring.

The number of tiles is a scaling factor. One can achieve strong scaling by improving latency and throughput without increasing memory requirements by using embodiments described in this specification. However, batching tiles together to scale compute ability increases memory requirements and the number of activations needed. It is hard to do batch type scaling without increasing memory bandwidth beyond conventional memory options. Batching often involves real-time applications and involves both latency and throughput requirements.

It is worth noting that having parameters in a cache is different than having parameters in wide memory as part of a tile arrangement. Having a tile arrangement as described in this specification provides compile type locality. For example, putting fully-connected models next to the SRAM results in greater internal bandwidth vs a cache model.

Embodiments described in this specification operate faster than conventional neural network accelerators. Certain embodiments have more operators; in order to feed the operators the accelerators need more internal bandwidth. To address this need the architecture distributes memory and brings the parameters onto the accelerator.

The largest current chips are about 650 square millimeters. Thus, there are limitations on how much SRAM one can have on the chip. Embodiments include using dense memory in given space constraints, including using 3D stacking.

The embodiments described in this specification apply to both inference (post trained) mode and to training mode.

As an added nuance, there is another level of hierarchy; there is memory hierarchy and there is also typically a register file hierarchy. Parameters are loaded into the register and then the register is reused to achieve memory bandwidth expansion; there is memory bandwidth in the register files as well as in the memory. In other words, there is an added cost savings, i.e., reduction in the wiring from memory to register file and then from register file to compute. In embodiments described in this specification, there is a reduced wiring cost associated with the register file; parameters are consumed off of SRAM directly to addressing. In other words, the memory directly feeds the alus.

Figure 7:
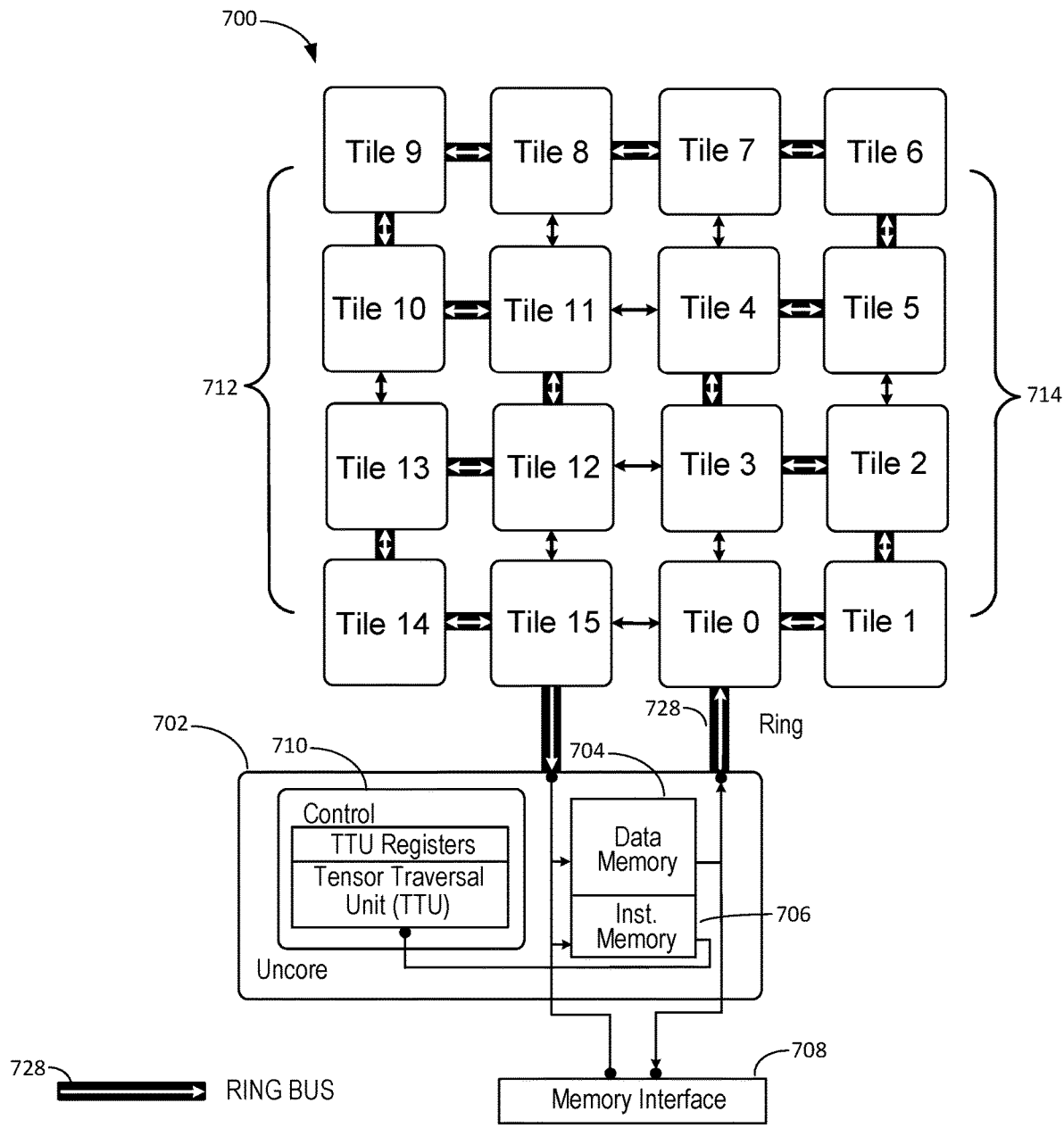
FIG. 7 is an alternative embodiment of a computation system.

FIG. 7 shows a block diagram of an alternative embodiment of a computing system 700 for accelerating tensor computations associated with deep neural networks (DNNs). The system 700 generally includes a controller/uncore 702, a memory interface 708, multiple tiles including a first tile set 712 and a second tile set 714. Controller 702 generally includes data memory 704, instruction memory 706, and at least one processor configured to execute one or more instructions encoded in a computer readable storage medium. Instruction memory 706 may store one or more machine readable instructions that are executable by the one or more processors of controller 702. Data memory 704 may be any of a variety of data storage mediums for storing and subsequently accessing a variety of data relating to computations that occur within system 700.

Controller 702 is configured to execute one or more instructions relating to tensor computations within system 700, including instructions stored in instruction memory 706. In some implementations, data memory 704 and instruction memory 706 are volatile memory unit or units. In some other implementations, data memory 704 and instruction memory 706 are non-volatile memory unit or units. Data memory 704 and instruction memory 706 may also be another form of computer-readable medium, such as a floppy disk device, a hard disk device, an optical disk device, or a tape device, a flash memory or other similar solid state memory device, or an array of devices, including devices in a storage area network or other configurations. In various implementations, controller 702 may also be referenced or referred to as core manager 702.

Memory interface 708 receives instructions and data parameters from an I/O link and provides instructions and parameters to controller 702. In general, instructions can be provided to one or more devices in system 700 through instruction bus (the instruction bus between the controller and the tiles is not shown) and parameters can be provided to one or more devices in system 700 through ring bus 728. In some implementations, instructions are received by controller 702 from host interface 708 at an initial time and stored in instruction memory 706 for execution by controller 702 at a later time.

Ring bus 728 originates from controller 102 and provides communications coupling through a bus data path that connects tiles 712, 714 in a ring back to controller 702. In various implementations, ring bus 728 generally connects or couples all wide memory units in all tiles 712, 714. Thus, a payload width of ring bus 728 corresponds to the width of the wide memory units disposed within each tile of tile sets 712, 714. As discussed above, ring bus 728 also includes a bitmap header indicating the tiles that need to consume payload data comprising instructions or parameters communicated via ring bus 728.

With regard to data (i.e., payload) received at a particular tile via ring bus 728, in response to receiving the information, each tile will zero (i.e., clear out) position data indicated in the bitmap header that is unique to the receiving tile before forwarding the data onto another tile. Hence, when the header bitmap has no remaining bit set data indicating a particular tile that is to receive the payload, forwarding of the payload to another tile will stop. Payload data generally refers to activations and weights used by one or more tiles during tensor computations performed based on execution of deeply nested loops.

In some implementations, controller 702 may be described as being a part of ring bus 728. In one example, for DMAOp instructions executed within a particular tile, controller 702 may be used to pop the data/payload from ring bus stops and forward the payload to a ring bus stop in a next tile in the ring. Controller 702 may also cause the payload data to be committed to one or more wide memory units of the tile if such action is required by instructions in the bitmap header. The address of the one or more wide memory units to which the data needs to be written may be generated by DMAOp instructions within the particular tile.

In various implementations, each tile of tile set 712, 714 can either be a producer of payload data or a consumer of payload data. When a tile is a producer of payload data the tile reads the data from one or more of its wide memory units and multicasts the data over ring bus 728 for consumption by one or more other tiles. When a tile is a consumer of payload data the tile receives and writes the data to one or more wide memory units within the tile and forwards the payload data for consumption by one or more other tiles. With regard to movement of payload data via ring bus 728, there typically will only be one producer/master of data on ring bus 728 at any given time. The DMAOp instruction execution order (e.g., FIFO control scheme) in all tiles will ensure there is only one producer/master of data on ring bus 728 at a given time.

In some implementations, controller 702 uses a sync flag control architecture to ensure there is only one producer/master of payload data on ring bus 728 at a given time. In one example, every write by a tile to a ring output will trigger an increment of the corresponding sync flag count. Controller 702 may examine the payload data to determine the number of data chunks or segments that comprise the payload. Controller 702 then monitors execution by the tile to ensure the expected number of data segments are forwarded and/or consumed by the tile before another tile executes in master mode.

An exception to ensuring there is only one producer/master of data on ring bus 728 at a given time occurs when there are local multicast groups connected via ring bus 728 that do not have an overlapping region on the ring bus. An important requirement of this dual master multicast methodology is that different multicast groups must not be allowed to see each other's data packets because packet overlap may occur and lead to one or more data computation errors In contrast to FIG. 1, the tiles of FIG. 7 are connected by the ring bus in a zig-zag or serpentine manner while the tiles themselves form a square pattern. In the illustrated embodiments, the accelerator comprise 8 and 16 tiles respectively. In alternative embodiments, the accelerator can include more tiles.

FIG. 8 is a simplified illustration of the compute tile of FIG. 2.

Figure 9:
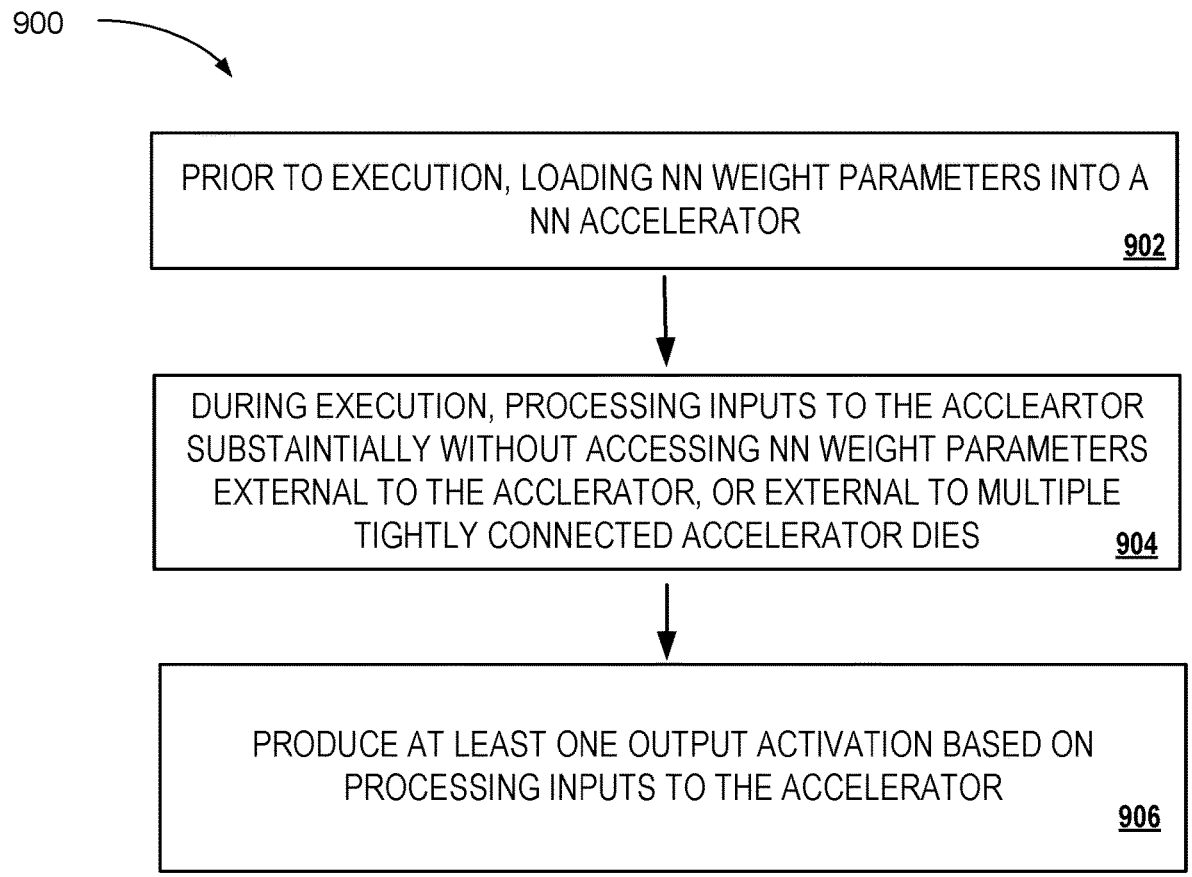
FIG. 9 is an example flow chart of a process for accelerating computations by loading neural network weight parameters into a neural network accelerator.

FIG. 9 is an example flow-chart of process 900 for performing tensor computations using a neural network (NN) compute tile, such as the compute tile 200 of FIG. 2. Process 900 begins at block 902 by loading, e.g., prior to execution, NN weight parameters into a NN accelerator. Process 900 continues at block 904 by processing inputs to the accelerator substantially without accessing neural network weight parameters external to the accelerator. At block 906 the process produces at least one output activation based on processing inputs to the accelerator.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An accelerator for accelerating tensor computations, comprising:
   a computing unit comprising:
   a memory bank comprising a register, the memory bank configured for storing a sufficient amount of machine learning parameters on the computing unit to allow for latency below a specified level with throughput above a specified level for a given machine learning model;
   at least one cell comprising at least one operator that receives the stored machine learning parameters from the memory bank and performs one or more computations; and
   wherein the one or more computations are associated with at least one element of a data array, the one or more computations being performed by the at least one operator and comprising, in part, a multiply operation of an input parameter and a parameter received from the memory bank, and wherein the memory bank, a tensor traversal unit in data communication with another memory bank, and the at least one operator are located on a same die.

2. The accelerator of claim 1, wherein the memory bank is configured to store more than 100,000 parameters.

3. The accelerator of claim 1, wherein the memory bank is configured to store more than 1,000,000 parameters.

4. The accelerator of claim 1, wherein the memory bank is configured to store more than 100,000,000 parameters.

5. The accelerator of claim 1, wherein the memory bank comprises SRAM.

6. The accelerator of claim 1, further comprising a data bus accessible by the at least one operator.

7. The accelerator of claim 6, wherein the tensor traversal unit is configured to provide a control signal to the other memory bank to cause an input activation to be provided to the data bus accessible by the at least one operator.

8. The accelerator of claim 7, wherein the other memory bank is configured to provide the data bus one-by-one broadcast of input activations such that each of the at least one operator receives a respective input activation.

* * * * *